United States Patent
Min

(10) Patent No.: US 9,852,346 B2
(45) Date of Patent: Dec. 26, 2017

(54) TRAILER TRACK ESTIMATION SYSTEM AND METHOD BY IMAGE RECOGNITION

(71) Applicant: HYUNDAI MOBIS CO., LTD., Seoul (KR)

(72) Inventor: Jae Hong Min, Yongin (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/542,270

(22) Filed: Nov. 14, 2014

(65) Prior Publication Data

US 2016/0098604 A1 Apr. 7, 2016

(30) Foreign Application Priority Data

Oct. 7, 2014 (KR) .................. 10-2014-0135276

(51) Int. Cl.
| | |
|---|---|
| G06K 9/00 | (2006.01) |
| B60R 1/00 | (2006.01) |
| B62D 15/02 | (2006.01) |
| B60D 1/24 | (2006.01) |
| B62D 13/06 | (2006.01) |
| B60D 1/62 | (2006.01) |

(52) U.S. Cl.
CPC ......... *G06K 9/00791* (2013.01); *B60D 1/245* (2013.01); *B60D 1/62* (2013.01); *B60R 1/00* (2013.01); *B62D 13/06* (2013.01); *B62D 15/029* (2013.01); *B60R 2300/10* (2013.01); *B60R 2300/307* (2013.01); *B60R 2300/80* (2013.01)

(58) Field of Classification Search
CPC .. G08B 21/00; G06F 1/16; B60D 1/00; H04N 7/18
See application file for complete search history.

(56) References Cited

U.S. PATENT DOCUMENTS

| | | | | |
|---|---|---|---|---|
| 6,125,030 | A * | 9/2000 | Mola | B60R 7/04 16/357 |
| 2003/0052969 | A1* | 3/2003 | Satoh | B60R 1/00 348/148 |
| 2004/0021291 | A1* | 2/2004 | Haug | B60D 1/30 280/455.1 |
| 2004/0130622 | A1* | 7/2004 | Lang | B60R 11/04 348/148 |
| 2010/0007478 | A1* | 1/2010 | Hahn | B62D 13/06 340/431 |

(Continued)

FOREIGN PATENT DOCUMENTS

| | | | | |
|---|---|---|---|---|
| DE | 102006007805 | * | 8/2007 | ............... B60D 1/30 |
| JP | 2001-191964 A | | 7/2001 | |

(Continued)

OTHER PUBLICATIONS

DE102006007805 Mashine translation;English (Espacenet).*

*Primary Examiner* — Abby Lin
*Assistant Examiner* — Paul Castro

(57) ABSTRACT

The present invention provides a trailer track estimation system by image recognition including: an image photographing unit which photographs a trailer which is connected to a rear side of a vehicle; a control unit which estimates a connection angle of the trailer using an image photographed by the image photographing unit; and a display unit which displays a value estimated by the control unit on a screen.

18 Claims, 4 Drawing Sheets

(56) References Cited

U.S. PATENT DOCUMENTS

| | | | | |
|---|---|---|---|---|
| 2012/0200706 A1* | 8/2012 | Greenwood | ............. | B60R 1/00 |
| | | | | 348/148 |
| 2014/0200759 A1* | 7/2014 | Lu | ......................... | B60D 1/245 |
| | | | | 701/28 |
| 2015/0203156 A1* | 7/2015 | Hafner | .................. | B62D 13/06 |
| | | | | 701/36 |
| 2015/0298738 A1* | 10/2015 | Hoel | ..................... | B62D 13/06 |
| | | | | 701/41 |

FOREIGN PATENT DOCUMENTS

| | | | |
|---|---|---|---|
| JP | 2002-068032 | A | 3/2002 |
| JP | 2003-148938 | A | 5/2003 |
| JP | 3643076 | B2 | 4/2005 |
| JP | 4286468 | B2 | 1/2009 |
| JP | 2012-166647 | A | 9/2012 |
| KR | 10-2014-0069528 | A | 6/2014 |

\* cited by examiner

[FIG. 1]
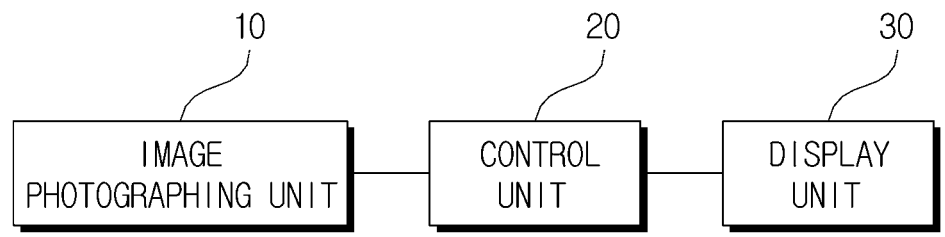

[FIG. 2A]
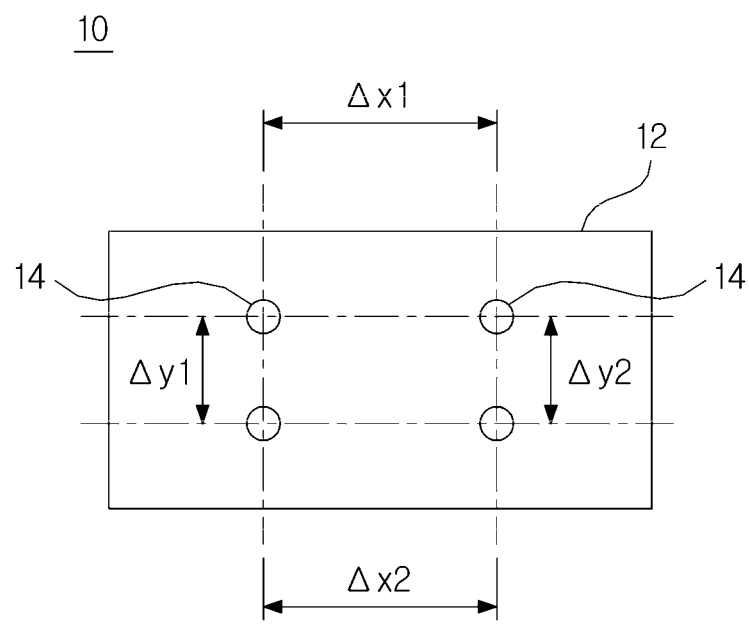
[FIG. 2B]
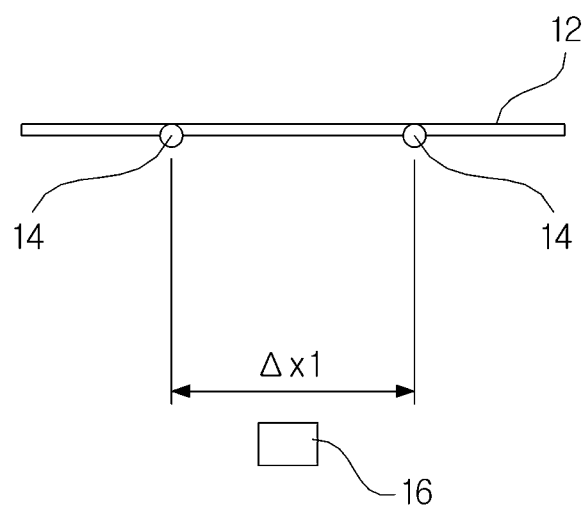

[FIG. 3A]
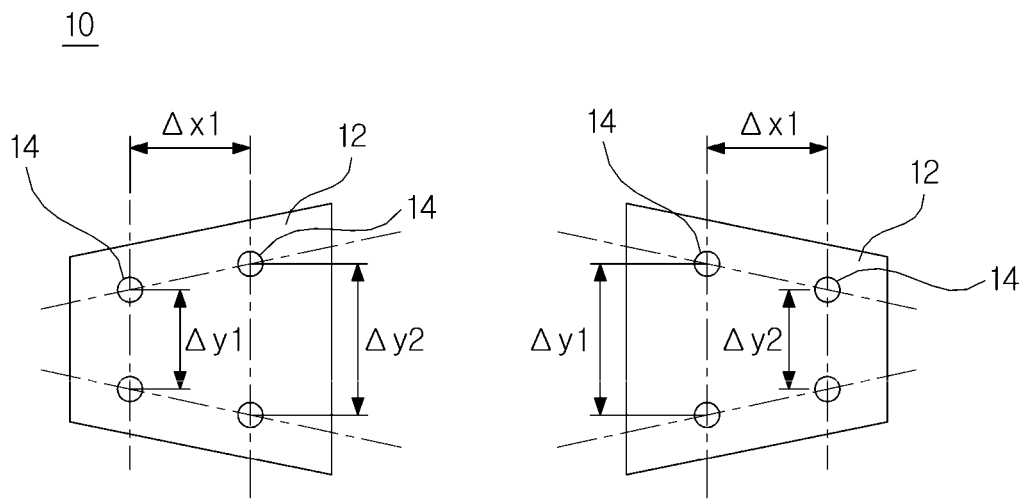
[FIG. 3B]
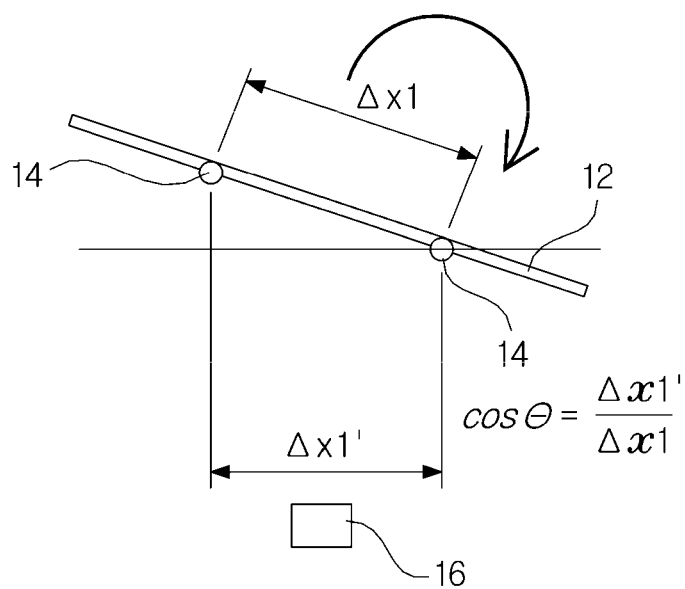
$$\cos\Theta = \frac{\Delta x1'}{\Delta x1}$$

[FIG. 4]
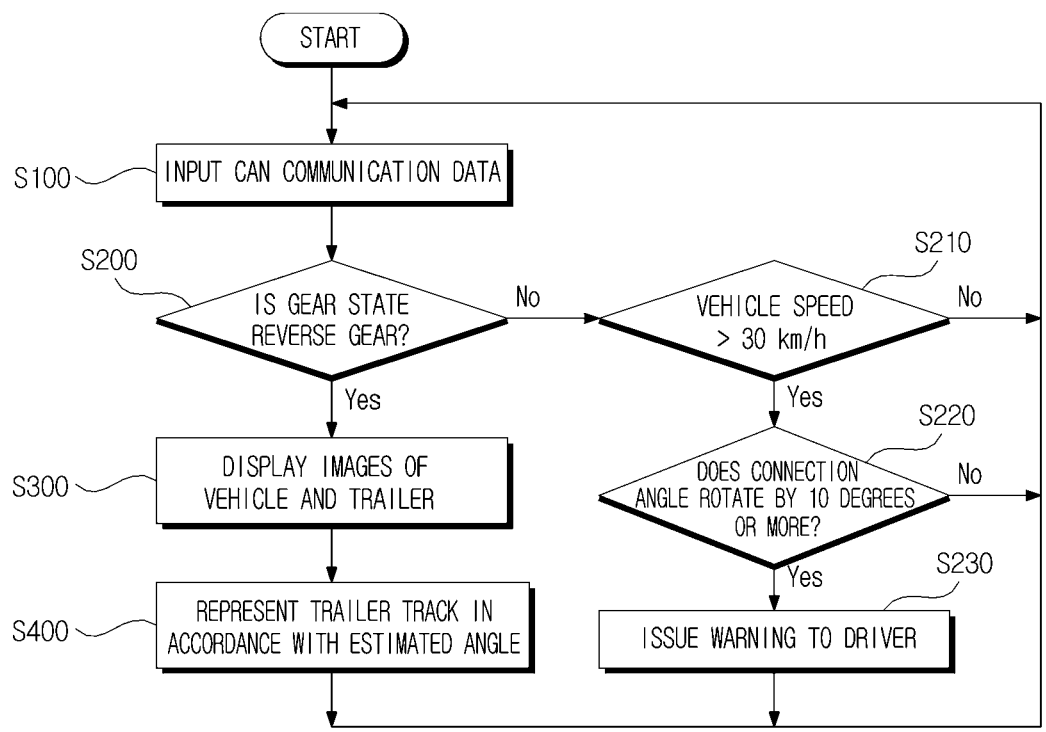

TRAILER TRACK ESTIMATION SYSTEM AND METHOD BY IMAGE RECOGNITION

CROSS-REFERENCE TO RELATED APPLICATIONS

This application claims priority to and the benefit of Korean Patent Application No. 10-2014-0135276 filed in the Korean Intellectual Property Office on Oct. 7, 2014, the entire contents of which are incorporated herein by reference.

TECHNICAL FIELD

The present invention relates to a trailer track estimation system and method by image recognition and, more particularly, to a trailer track estimation system and method by image recognition which estimate a track of a trailer using a rear view camera which is installed in a vehicle and a recognition algorithm.

BACKGROUND ART

Campers who travel with a vehicle to which a trailer is connected have increased, in accordance with demands of people who can afford a higher quality lifestyle.

While the trailer is connected to the vehicle using one pin, it is hard for a driver to keep a track of the trailer while driving. When the trailer is mounted in the vehicle, the trailer blocks a visual field of the rear view camera so that a rear side cannot be watched. Therefore, the rear view camera which is already mounted becomes useless, which does not help the driver drive the vehicle.

Recently, a backward movement assisting device for a vehicle which assists the driver to back the vehicle by detecting a folding degree of a joint between the vehicle and the trailer using an infrared sensor and then displaying the folding degree for the driver has been suggested.

However, in the case of the backward movement assisting device for a vehicle, an additional infrared sensor needs to be provided, which may increase cost.

RELATED ART DOCUMENT

Korean Patent Application Laid-Open No. 2014-0069528

SUMMARY OF THE INVENTION

The present invention has been made in an effort to provide a trailer track estimation system and method by image recognition which calculates a rotational angle between a vehicle and a trailer which is connected to the vehicle and visually provides the calculated rotational angle to a driver to assist the driver to drive a vehicle.

An exemplary embodiment of the present invention provides a trailer track estimation system by image recognition, including: an image photographing unit which photographs a trailer which is connected to a rear side of a vehicle; a control unit which estimates a connection angle of the trailer using an image photographed by the image photographing unit; and a display unit which displays a value estimated by the control unit on a screen.

The image photographing unit may be a rear view camera of the vehicle.

The rear view camera may be a CCD camera or a CMOS camera.

The control unit may define a plurality of feature points on image photographs a front of the trailer of the trailer and is recognized by the image photographing unit in a stop state, and estimates the connection angle of the trailer using a ratio of a distance between the feature points in an aligned state of the vehicle and the trailer and a distance between the feature points when the vehicle and the trailer are misaligned while driving the vehicle.

The plurality of feature points may be defined as apexes of a rectangle.

The distance between the feature points may be measured by calculating a number of pixels between the feature points photographed by the image photographing unit.

The connection angle of the trailer may be estimated such that a distance in an aligned state of the vehicle and the trailer is defined as $\Delta x1$ and a distance in a misaligned state of the vehicle and the trailer is defined as $\Delta x1'$ and the connection angle of the trailer is calculated as follows.

$$\cos\theta = \frac{\Delta x1'}{\Delta x1}$$

The display unit may be a navigation system which is mounted in the vehicle.

The connection angle may be estimated plural times and the connection angle of the trailer may be represented by an average of a plurality of estimated values.

The another exemplary embodiment of the present invention provides a trailer track estimation method by image recognition including receiving basic data such as a speed or a gear of a vehicle, determining whether a gear of the vehicle is a reverse gear, displaying images of the vehicle and the trailer on a display unit when the gear is a reverse gear; and estimating a connection angle of the trailer from the image which is displayed on the display unit using the trailer track estimation system of any one of claims 1 to 9 and displaying a track of the trailer on the display unit.

The receiving of basic data may be performed through CAN communication.

The display unit may be a navigation system which is mounted in the vehicle.

The display unit may be a head-up display.

When the gear of the vehicle is not a reverse gear, the method may further include determining whether a speed of the vehicle exceeds a predetermined speed, determining whether a rotational angle of the trailer exceeds a predetermined angle when the speed of the vehicle exceeds the predetermined speed; and issuing a warning to a driver when the rotational angle of the trailer exceeds the predetermined angle.

The predetermined speed and the predetermined angle may be defined as a speed and an angle at which danger to control stability is caused in accordance with a mechanical property of the vehicle.

The rotational angle of the trailer may be used for a stability control system.

The issuing of a warning may include issuing a warning to a display unit which is mounted in the vehicle.

In the issuing of a warning, the warning may be issued using a system which is recognized by a driver such as audio, a vibration device, or a light which is mounted in the vehicle.

According to the trailer track estimation system and method by image recognition according to the exemplary embodiment of the present invention, a rotational angle between the vehicle and the trailer which is connected to the vehicle is calculated and visibly displayed for the driver so that the driver may easily drive the vehicle.

An additional device which estimates a track of the trailer is not necessary, thereby reducing cost.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 1 is a block diagram for track estimation according to an exemplary embodiment of the present invention.

FIGS. 2A and 2B are a view illustrating an aligned state of a vehicle and a trailer which is photographed using a rear view camera according to an exemplary embodiment of the present invention.

FIGS. 3A and 3B are a view illustrating a misaligned state of a vehicle and a trailer which is photographed using a rear view camera according to an exemplary embodiment of the present invention.

FIG. 4 is a flowchart for estimating a track of a trailer according to another exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

A trailer track estimation system by image recognition according to an exemplary embodiment of the present invention will be described in detail with reference to accompanying drawings. In the figures, it should be noted that even though the parts are illustrated in different drawings, it should be understood that like reference numerals refer to like parts of the present invention throughout the several figures of the drawing. Hereinafter, exemplary embodiments of the present invention will be described. However, it should be understood that the technical spirit of the invention is not limited to the specific embodiments, but may be changed or modified in various ways by those skilled in the art.

FIG. 1 is a block diagram for track estimation according to an exemplary embodiment of the present invention, FIGS. 2A and 2B are a view illustrating an aligned state of a vehicle and a trailer which is photographed using a rear view camera according to an exemplary embodiment of the present invention, and FIGS. 3A and 3B are a view illustrating a misaligned state of a vehicle and a trailer which is photographed using a rear view camera according to an exemplary embodiment of the present invention.

Referring to FIGS. 1 to 3, a trailer track estimation system by image recognition according to an exemplary embodiment of the present invention may include an image photographing unit 10 which photographs a trailer which is connected to a rear side of a vehicle, a control unit 20 which estimates a connection angle of the trailer using an image photographed by the image photographing unit, and a display unit 30 which displays a value estimated by the control unit on a screen.

The image photographing unit 10 photographs an image of a trailer 12 which is connected to the rear side of the vehicle. According to an exemplary embodiment, a rear view camera 16 which is mounted at a rear side of the vehicle may be used as the image photographing unit 10. As for the rear view camera 16, a CCD camera or a CMOS camera may be used and various types of cameras may be used. Generally, when the vehicle backwardly moves, the rear view camera 16 automatically photographs the rear side of the vehicle so as to cause the driver to recognize the image of the rear side. However, when the trailer 12 is mounted in the rear side of the vehicle, athe rear view camera 16 photographs only a front side of the trailer 12 but a road or a building which is located behind the vehicle may not be recognized. Therefore, the rear view camera photographs the front side of the trailer 12 and transmits a photographed image to the control unit 20.

The control unit 20 estimates a connection angle of the trailer 12 using an image of the front side of the trailer 12 which is photographed by the image photographing unit 10.

The control unit 20 defines a plurality of feature points 14 on photographed image in an aligned state of the trailer 12, that is, in a horizontal state of the vehicle and the trailer 12 and estimates a connection angle of the trailer 12 and the vehicle using a distance ratio between the feature points 14 when the vehicle and the trailer 12 are not aligned in a line.

According to an exemplary embodiment, the control unit 20 may define four feature points 14 and the plurality of feature points may be defined as apexes of a rectangle. Distances between the feature points 14 may be measured by calculating a number of pixels between the feature points 14 photographed by the image photographing unit 10.

In order to calculate the connection angle of the trailer 12 and the vehicle, the control unit 20 defines a distance between two feature points 14 in an aligned state of the trailer 12 as $\Delta x1$ and a distance between the same feature points 14 in a misaligned state of the trailer 12 as $\Delta x1'$. A distance between two arbitrary feature points 14 photographed in the aligned state of the trailer 12 is a fixed value which does not vary and a distance between feature points 14 which is photographed in the misaligned state varies depending on a misaligned angle.

Therefore, the connection angle of the trailer 12 may be calculated by Equation 1.

$$\cos\theta = \frac{\Delta x1'}{\Delta x1} \quad \text{Equation 1}$$

The connection angle of the trailer 12 may be estimated by calculating a plurality of distances between the feature points 14 such as $\Delta x1$ and $\Delta x2$ and may be calculated by an average value thoseof in order to improve precision and reliability of estimation of the connection angle.

The display unit 30 displays the connection angle of the trailer 12 which is estimated by the control unit 20 on a screen.

According to an exemplary embodiment, the display unit 30 may be a navigation system or a head-up display which is mounted on a front panel of the vehicle. A type of the display unit 30 is not specifically limited and various devices which may be visually recognized by the driver may be employed. When the display unit 30 is a navigation system, if the vehicle backwardly moves, a navigation screen is switched to transmit the connection angle of the trailer 12 to the driver so that driving and parking may be assisted while connecting the trailer 12.

Hereinafter, a trailer track estimation method by image recognition according to another exemplary embodiment of the present invention will be described with reference to accompanying drawings. However, descriptions of the same matters as those described in the trailer track estimation method by image recognition according to the exemplary embodiment of the present invention will be omitted.

FIG. 4 is a flowchart for estimating a track of a trailer according to another exemplary embodiment of the present invention. The same reference numerals in FIG. 4 as those in FIGS. 1 to 3 denote the same components and detailed description thereof will be omitted.

Referring to FIG. 4, a trailer track estimation method by image recognition receives information on a vehicle using vehicle communication in step S100. According to an exemplary embodiment, the information may be transmitted using a CAN communication of the vehicle and information on a current state of the vehicle, that is, information on a speed or a gear is received.

After receiving the information, it is determined whether a current gear state is a reverse gear in step S200.

When the gear of the vehicle is the reverse gear, images of the vehicle and the trailer 12 are displayed on a screen in step S300. Generally, when the vehicle backwardly moves, a rear view camera 16 displays information on a rear side of the vehicle, a road or an obstacle on the screen. When the trailer 12 is mounted on the vehicle, an image of the trailer 12 which is at the rear side of the vehicle may be displayed on a navigation system which is mounted in the vehicle.

According to an exemplary embodiment, a virtual image such as top view is displayed using an angle between the vehicle and the trailer so that the user may easily recognize the state of the vehicle.

The control unit 20 estimates a connection angle of the trailer 12 to allow the driver to recognize a track of the trailer 12 in step S400. As described above, the control unit 20 designates a plurality of feature points 14 in an image of the trailer 12 which is displayed on the screen in an aligned state and estimates the connection angle of the trailer 12 using a distance between arbitrary feature points 14. In this case, the distance between the arbitrary feature points 14 may be measured using a number of pixels on the screen of the feature points 14 which are photographed by the rear view camera 16. The distance between the arbitrary feature points 14 does not vary, but the distance between the feature points 14 displayed on the screen varies in accordance with the connection angle of the trailer 12 so that the connection angle of the vehicle may be estimated.

In order to calculate the connection angle of the trailer 12 and the vehicle, the control unit defines a distance between two feature points 14 in an aligned state of the trailer 12 as $\Delta x1$ and a distance between the same feature points 14 in a misaligned state of the trailer 12 as $\Delta x1'$. A distance between two arbitrary feature points 14 photographed in the aligned state of the trailer 12 is a fixed value which does not vary and a distance between feature points which are photographed in the misaligned state varies depending on a misaligned angle.

Therefore, the connection angle of the trailer 12 may be calculated by Equation 2.

$$\cos\theta = \frac{\Delta x1'}{\Delta x1} \quad \text{Equation 2}$$

The track of the trailer 12 which is connected to the vehicle in accordance with the connection angle estimated as described above is displayed on the display unit 30 so that the driver may recognize a current state of the trailer.

When the gear of the vehicle is not a reverse gear, it is determined that a current speed of the vehicle exceeds a predetermined speed in step S210. When the speed of the vehicle exceeds the predetermined speed, it is determined whether the connection angle of the trailer 12 rotates by a predetermined angle or more in step S220.

The predetermined speed of the vehicle and the predetermined angle mean a speed and an angle at which danger to control a stability is caused in accordance with a mechanical property of the vehicle but the specific speed and the specific angle illustrated in the drawing are only examples.

According to an example, when the gear of the vehicle is not a reverse gear, it is determined that a current speed of the vehicle exceeds 30 km/h in step S210. When the speed of the vehicle exceeds 30 km/h, it is determined whether the connection angle of the trailer 12 rotates by 10 degrees or more in step S220. When the angle of the trailer 12 rotates by 10 degrees or more while the vehicle forwardly moves, an error may be incurred in the connected portion in many cases, warning may be issued to the driver.

In step S230 of issuing a warning to the driver, a warning is issued to indicate that an error is incurred in the present connected state with the trailer and the warning may be displayed on the display unit 30 which is mounted in the vehicle.

A method of issuing the warning is not specifically limited and various systems which may be recognized by a driver such as an audio, a vibration device, or a light which is mounted in the vehicle may be used.

The method of estimating the rotational angle of the trailer mentioned above may be used for a vehicle stability control system and modified embodiments in various fields may be allowed.

As described above, according to the trailer track estimation system and method by image recognition according to the exemplary embodiment of the present invention, a rotational angle between the vehicle and the trailer which is connected to the vehicle is calculated and visibly displayed for the driver so that the driver may easily drive the vehicle.

An additional device which estimates a track of the trailer is not necessary, thereby reducing the cost.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A trailer track estimation system using image recognition, the system comprising:
    an image photographing unit which photographs a trailer which is connected to a rear side of a vehicle;
    a control unit which estimates a connection angle of the trailer using first and second images photographed by the image photographing unit; and
    a display unit which displays the connection angle estimated by the control unit on a screen,
    wherein the control unit is configured to estimate the connection angle of the trailer using a ratio between a first distance and a second distance, the first distance being a distance between two feature points on the first image when the trailer is aligned with the vehicle, the second distance being a distance between the two feature points on the second image when the trailer is misaligned with the vehicle, and
    wherein the connection angle of the trailer is estimated such that the first distance is defined as $\Delta x1$ and the second distance is defined as $\Delta x1'$ and the estimated connection angle $\theta$ of the trailer is calculated according to the following equation:

$$\cos \theta = \Delta x1'/\Delta x1.$$

2. The system of claim 1, wherein the image photographing unit is a rear view camera of the vehicle.

3. The system of claim 2, wherein the rear view camera is a CCD camera or a CMOS camera.

4. The system of claim 1, wherein the first distance is determined when the vehicle is stopped, and the second distance is determined when the vehicle is moving.

5. The system of claim 4, wherein the two feature points are corners of a rectangle, and the first and second distances correspond a side of the rectangle.

6. The system of claim 5, wherein the first and second distances are measured by calculating a number of pixels between the feature points photographed by the image photographing unit.

7. The system of claim 1, wherein the display unit is a display of a navigation system which is mounted in the vehicle.

8. The system of claim 1, wherein the connection angle is estimated by averaging a plurality of estimated angle values.

9. A trailer track estimation method by image recognition, the method comprising:
    receiving basic data of a vehicle;
    determining whether a gear of the vehicle is a reverse gear;
    displaying images of the vehicle and the trailer on a display unit when the gear is a reverse gear; and
    estimating, by the trailer track estimation system of claim 1, the connection angle of the trailer from the image which is displayed on the display; and
    displaying a track of the trailer on the display unit.

10. The method of claim 9, wherein the receiving of basic data uses CAN communication.

11. The method of claim 9, wherein the display unit is a head-up display.

12. The method of claim 9, further comprising:
    when the gear of the vehicle is not a reverse gear,
    determining whether a speed of the vehicle exceeds a predetermined speed;
    determining whether a rotational angle of the trailer exceeds a predetermined angle when the speed of the vehicle exceeds the predetermined speed; and
    issuing a warning to a driver when the rotational angle of the trailer exceeds the predetermined angle.

13. The method of claim 12, wherein the predetermined speed and the predetermined angle are defined as a speed and an angle at which danger to control stability is caused in accordance with a mechanical property of the vehicle.

14. The method of claim 12, wherein the rotational angle of the trailer is used for a stability control system.

15. The method of claim 12, wherein the issuing of a warning includes issuing a warning to a display unit which is mounted in the vehicle.

16. The method of claim 12, wherein the issuing of a warning is issued using a system which is recognized by a driver, wherein the system includes at least one of audio, vibrator and light source in the vehicle.

17. A method for estimating an angle between a vehicle and a trailer attached to the vehicle, the method comprising:
    capturing a first image of a front face of the trailer by a camera mounted on the vehicle when the trailer is aligned with the vehicle;
    capturing a second image of the front face of the trailer by the camera when the trailer is misaligned with the vehicle;
    transmitting the first and second images from the camera to a control unit coupled to the camera;
    determining, by the control unit, a ratio between a first distance between two feature points of the front face of the trailer in the first image to a second distance between the two feature points in the second image;
    estimating, by the control unit, the connection angle between the vehicle and the trailer based on the ratio; and
    displaying the estimated connection angle on a display screen,
    wherein the connection angle of the trailer is estimated such that the first distance is defined as $\Delta x1$ and the second distance is defined as $\Delta x1'$ and the estimated connection angle $\theta$ of the trailer is calculated according to the following equation:

$$\cos \theta = \Delta x1'/\Delta x1.$$

18. The method of claim 17, wherein the first and second feature points are oriented in a first direction, the method further comprising:
    determining, by the control unit, a ratio between a third distance between the first feature point and a third feature point in the first image and a fourth distance between the first feature point and a third feature point in the second image,
    wherein an orientation of the first and second distances is orthogonal to an orientation of the third and fourth distances.

* * * * *